(12) United States Patent
Ando et al.

(10) Patent No.: US 7,706,221 B2
(45) Date of Patent: Apr. 27, 2010

(54) INFORMATION RECORDING/REPRODUCING APPARATUS

(75) Inventors: Akira Ando, Yokohama (JP); Kazunori Uemura, Ebina (JP); Masahiro Fujimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 647 days.

(21) Appl. No.: 11/679,261

(22) Filed: Feb. 27, 2007

(65) Prior Publication Data

US 2008/0019250 A1    Jan. 24, 2008

(30) Foreign Application Priority Data

Jul. 19, 2006   (JP)   ............... 2006-196417

(51) Int. Cl.
*G11B 7/00*   (2006.01)

(52) U.S. Cl. ............... 369/47.12; 369/84; 369/47.33

(58) Field of Classification Search ............... 369/47.12, 369/84, 47.51, 47.33, 83, 53.36, 53.12, 53.1, 369/47.13

See application file for complete search history.

(56) References Cited

U.S. PATENT DOCUMENTS

| 5,412,628 | A | 5/1995 | Yamazaki et al. |
| 7,013,077 | B2 | 3/2006 | Honjo |
| 7,391,533 | B2 * | 6/2008 | Hiromatsu ............... 358/1.9 |

FOREIGN PATENT DOCUMENTS

| JP | 61-242372 | 10/1986 |
| JP | 2-11544 | 1/1990 |
| JP | 06-150404 | 5/1994 |
| JP | 07-272444 | 10/1995 |
| JP | 2001-320669 | 11/2001 |
| JP | 2004-039133 | 2/2004 |

OTHER PUBLICATIONS

PC DOS J7.0/V—IBM Japan 1995, No. 119 pp. 5-11.

* cited by examiner

*Primary Examiner*—Nabil Z Hindi
(74) *Attorney, Agent, or Firm*—Antonelli, Terry, Stout & Kraus, LLP.

(57) ABSTRACT

Disclosed herein is an information recording/reproducing apparatus that includes a first and a second recording/reproducing modules, a buffer memory to store information temporally, and a control module that switches between a first mode and a second mode when the information is dubbed from the first recording/reproducing module to the second recording/reproducing module. In the first mode, information in the first recording/reproducing module is reproduced and stored in the buffer memory. In the second mode, the information stored in the buffer memory is recorded in the second recording/reproducing module. The apparatus further includes a temperature detecting module. Depending on the temperature detected by this module, the apparatus changes the movement of the second recording/reproducing module in the first mode and the movement of the first recording/reproducing module in the second mode.

1 Claim, 10 Drawing Sheets

Power Consumption of Video Camera of the Present Invention

FIG.12

Dubbing is inoperative due
to Rise in Temperature

INFORMATION RECORDING/REPRODUCING APPARATUS

BACKGROUND

The present invention relates to an information recording/reproducing apparatus and, more particularly, to an information recording/reproducing apparatus that is equipped with two or more recording/reproducing modules and has a function (e.g., dubbing) to transfer data recorded in one recording/reproducing module to the other recording/reproducing module.

Recently DVD (Digital Versatile Disc) recorders have been growing drastically in the market related to stationary picture recorders used for recording television broadcasts. In particular, recorders equipped with functions of both a HDD (Hard Disc Drive) and a DVD have been coming into wide use rapidly due to their high convenience. One of the features of the recorders with HDD & DVD functions is that users can select a recording medium in accordance with the intended use for example, in such a way as to dub only favorite programs on the DVD after recording multiple programs on the HDD.

As a conventional art of such dubbing functions, the technique described in Japanese Unexamined Patent Application Publication (JP-A) No. 2001-320669 is proposed. The art cites as "Problem to be solved by the Invention" a signal processing device where the dubbing status can be monitored during high speed dubbing processing of digital image data or digital audio data. The art also cites as "Means for Solving the Problem" the device so configured as to include a first memory device 101 where MPEG system streams are stored as digital data, a second memory device 102 to store MPEG system streams as digital data, and a decoding module 103 that performs decoding on system streams read out from the first memory device 101, and to perform discrete decoding processing on system streams that are transferred at higher speed than usual data reproducing processing from the first memory device 101 to the second memory device 102 through the decoding module 103.

As another conventional art, the technique described in JP-A-1994-150404 is proposed. The art cites as "Object of the Invention" a signal processing device that generally includes only one recording/reproducing deck, in particular, uses only one optical pickup whereby can perform dubbing processing of data from a reproducing optical disk to a recording optical disk and that is so configured as to include: recording means 7 and 16 that intermittently write data to be recorded into an optical disk using a recording magnetic head 14 and a recording/reproducing optical head 3; reproducing means 7 and 16 that intermittently read out data to be reproduced from the optical disk using the optical head; a memory means 9 that temporarily stores the reproduced data read out from a reproducing optical disk 1R using the reproducing means during the waiting period of the recording means; dubbing control means 10 and 16 that writes the reproduced data stored in the recording means into another recording optical disk 1 using the recording means during the waiting period of the reproducing means; and head moving means 4, 6 and 22 that move the optical head above the reproducing optical disk during a reproducing operation and move the magnetic head and the optical head over the recording optical disk during a recording operation.

As still another conventional art, the technique described in JP-A-1995-272444 has been also proposed. The art describes a device that is so configured as to dub data recorded on a first recording medium on a second recording medium by alternately performing a reproducing operation where data to be reproduced are written from the first recording medium 1 into an audio buffer memory 13 and a recording operation where the written data are recorded on the second recording medium 2 through moving and making a recording/reproducing head 8 access the first recording medium 1 and the second recording medium 2, both media are closely arranged to each other and adapted to be driven to rotate independently. It is also cited as an effect of the art that the recording/reproducing head 8 and a signal processing circuit 10 can be shared between the recording operation and the reproducing operation during dubbing processing, leading to simplification of the device configuration and reduction of the production cost. It is also cited as another effect of the art that switching between the accessed media in a short period of time through moving the recording/reproducing head 8 permits of a higher-speed dubbing processing. The art also states that although the example to control the rotation speed of the recording medium that is not being accessed at the speed stored in a memory 25 during dubbing processing, where the recording/reproducing head 8 is made to alternately access the first recording medium 1 and the second recording medium 2, has been described, various modifications may be made. For example, it may be possible that the rotation drive of the recording medium 1 or 2 that is not being accessed by the recording/reproducing head 8 is stopped for a while depending on switching intervals and that the rotation drive is started again just before the next switching so that the rotation speed gets equal to the speed stored in a memory 25. Such a control over the recording media can be done every time the switching between the accessed media is performed. By selecting the control technique and so on according to circumstances, wasteful electric consumption can be reduced and higher economic effect can be expected.

SUMMARY

Currently, in the video camera market, video cameras equipped with various recording media such as HDD video cameras characterized by long time recording capability thereof and DVD video cameras characterized by the convenient portability and high storage stability of recording media thereof have come into wide use in accordance with the intended use of users. Recently needs for the video camera market have been diversified and complicated, and video cameras with both an HDD drive and a DVD drive built-in seem to be advantageous. If video cameras with both an HDD drive and a DVD drive built-in have come onto market, user's needs for a dubbing function to copy or transfer data from the HDD to the DVD or vice versa will be expected to increase.

As to portable recording/reproducing devices such as video cameras, it has become very important to control generation of heat in devices in association with downsizing of devices. In particular, as to small devices such as video cameras, the internal temperature of those devices can easily increase. Therefore, if an optical disk is used in a portable information recording/reproducing apparatus, there are problems in that the recording/reproducing performance of the information recording/reproducing apparatus may go down in association with rise in temperature because the output power of a built-in laser for recording is easily affected by temperature changes. As to an HDD, there is also a strong demand for suppressing rise in temperature during a dubbing operation because the HDD is also easily adversely affected by rise in temperature with the result that the performance of the HOD may go down.

In the art of the JP-A-2001-320669, however, rise in temperature during a dubbing operation is not taken into consideration. In portable information recording/reproducing apparatuses such as video cameras, a considerable amount of power is consumed and the internal temperature of the apparatuses rises because an HDD and a DVD run at the same time during the dubbing operation where data are transferred from the HDD to the DVD. As a result, there are problems in that rise in the internal temperature of the apparatuses with both an HDD and a DVD built-in may reach to the point where the recording/reproducing performance of the DVD or the HDD is adversely affected.

In the art of the JP-A-1994-150404, power consumption during the waiting period of the recording operation or the reproducing operation is not taken into consideration. Therefore, in apparatuses where data are dubbed from an HDD to a DVD, a considerable amount of power is consumed even during the waiting period of the recording operation or the reproducing operation. As a result, there are problems in that rise in the internal temperature of the apparatuses may reach to the point where the recording/reproducing performance of the DVD or the HDD is adversely affected.

In operating state of a DVD drive, an optical head module and associated parts thereof that record data on the DVD or reproduce data from the DVD consume a large amount of power as well as a spindle motor that rotates the DVD. Therefore, because the internal temperature of the apparatus is also risen by the power consumed in the optical head module, it is necessary to give consideration to how to reduce the consumed power.

In the art of the JP-A-1995-272444, a recording medium that is not being accessed stops its rotation movement temporarily to reduce power consumption. However, in apparatuses where data are dubbed from an HDD to a DVD, there are problems in that heat generated in a optical head module of the DVD that records data may rise the internal temperature of the apparatuses to the point where the recording/reproducing performance of the DVD or the HDD is adversely affected.

One of the objects of the present invention is, for example, to provide an information recording/reproducing apparatus, wherein dubbing processing is performed through operating a first recording/reproducing module and a second recording/reproducing module alternately using a buffer memory for temporally holding data, with a function to suppress rise in the internal temperature of the apparatus by putting the halting drive of the two drives (the HDD or the DVD drive) in low power consumption mode.

In one aspect of the present invention, an information recording/reproducing apparatus includes: a first recording/reproducing module; a second recording/reproducing module; a buffer memory to store information temporarily; and a control module that switches between a first mode and a second mode in the case where the information is dubbed from the first recording/reproducing module to the second recording/reproducing module. In the first mode information in the first recording/reproducing module is reproduced and stored in the buffer memory. In the second mode, the information stored in the buffer memory is recorded in the second recording/reproducing module.

The techniques used in the information recording/reproducing apparatus serves to protect, for example, users' data and the hardware of the apparatus from being damaged by rise in the internal temperature of the apparatus.

Problems, means and effects other than those mentioned above will be described in after-mentioned embodiments.

BRIEF DESCRIPTION OF THE DRAWING

These and other features, objects and advantages of the present invention will become more apparent from the following description when taken in conjunction with the accompanying drawings wherein:

FIG. 12 is a drawing showing an example of a display screen of the video camera.

DETAILED DESCRIPTION OF PREFERRED EMBODIMENTS

The preferred embodiments of the present invention will be described below using video cameras as examples of information recording/reproducing apparatuses. However, the present invention is not limited to the specific embodiments thereof. For Example, although the present invention is particularly useful to small and portable apparatuses that are sensitive to rise in temperature such as video cameras, the present invention can be also applied to other types of information recording/reproducing apparatuses such as stationary recorders. In addition, in the flowcharts or the block diagrams of the preferred embodiments of the present invention described below, the blocks and the steps can be chosen or discarded, and the excursion sequences of the steps can be changed.

First Embodiment

A first embodiment of the present invention will be described in detail hereafter with reference to FIG. 1 to FIG. 6, and FIG. 12.

A configuration example of a video camera of the first embodiment and a flow of behaviors and control processes of the video camera during a dubbing operation will be described with reference to FIG. 1 and FIG. 2.

Figure 2:
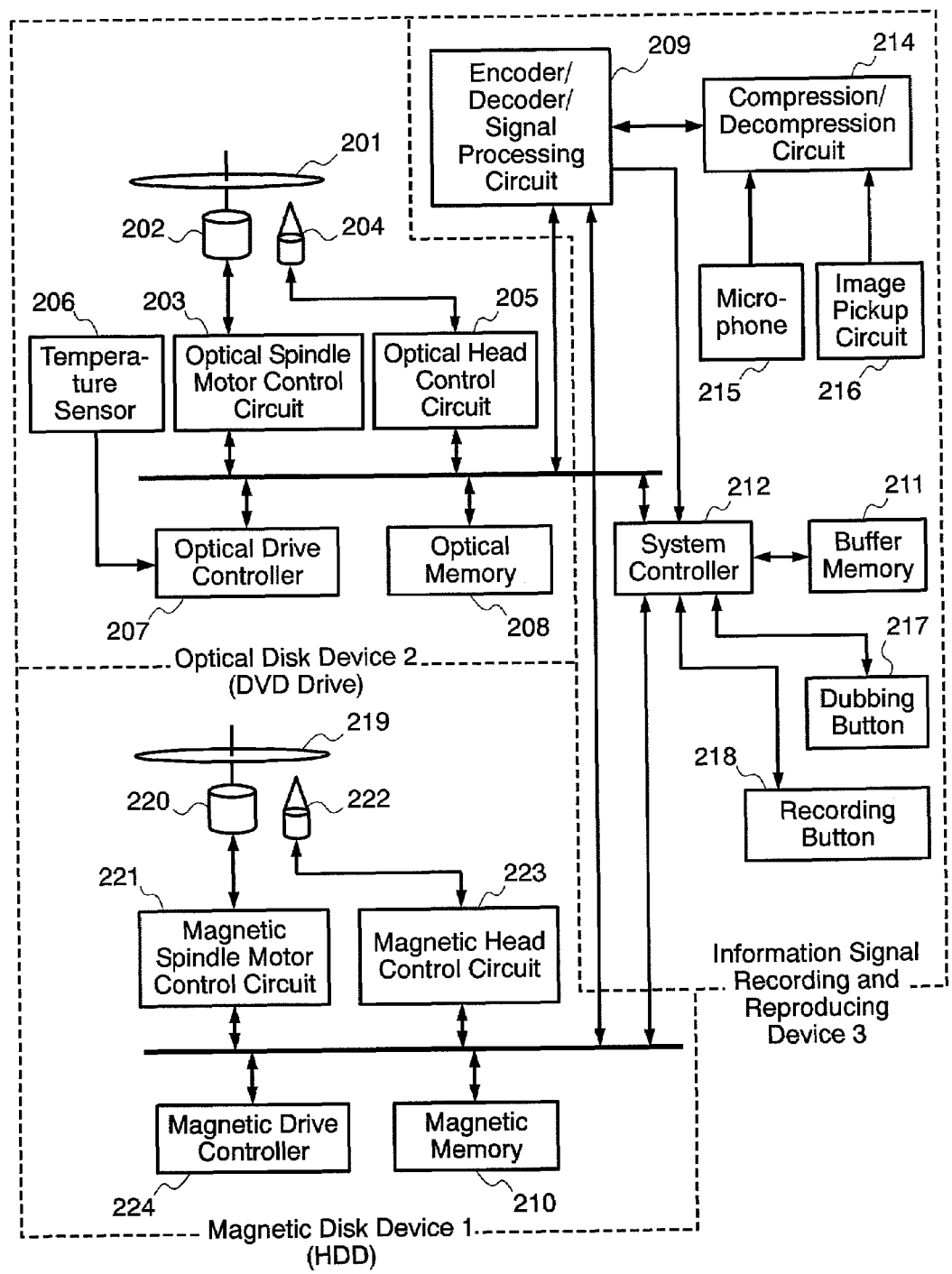
FIG. 2 is a block diagram showing a configuration example of the video camera of the first embodiment.

FIG. 2 shows a configuration example of the video camera of the first embodiment in which: 201 is a removable optical disk, 202 is an optical spindle motor, 203 is an optical spindle motor control circuit, 204 is an optical head module, 205 is an optical head control circuit, 206 is a temperature sensor that forms a temperature detecting module, 207 is an optical drive controller, 208 is an optical memory (a semiconductor memory for an optical disk drive), 209 is an encoder/decoder/signal processing circuit, 210 is a magnetic memory, 211 is a buffer memory, 212 is a system controller that forms a system control module, 214 is a compression/decompression circuit, 215 is a microphone, 216 is an image pickup circuit (including CCD, CMOS), 217 is a dubbing button, 218 is a recording button, 219 is a magnetic disk, 220 is a magnetic spindle motor, 221 is a magnetic spindle motor control circuit, 222 is a magnetic head module, 223 is a magnetic head control circuit, and 224 is a magnetic drive controller. Note that 201 to 208 form an optical disk drive 2 (DVD drive) that is a second recording/reproducing module, 209 and 211 to 218 form an information signal recording/reproducing module 3, and 210 and 219 to 224 form a magnetic disk drive 1 (HDD) that is a first recording/reproducing module. Further note that an optical disk is not limited to a DVD but can be a BB (Blu-ray Disk) or HD-DVD (High Definition-DVD) and that the buttons can be either mechanical buttons or touch panels.

The optical disk 201 mounted on the optical spindle motor 202 is controlled to rotate at the specified rotation speed by the optical spindle motor control circuit 203. An objective lens in the optical head module 204 is configured to be moved in the focal direction and in the tracking direction by the optical head control circuit 205. In addition, a recording/reproducing operation toward the optical disk 201 is performed by writing information signals to or reading out information signals from the optical disk 201 through the optical head module 204 and the optical head control circuit 205, while these information signals are transferred back and forth via the encoder/decoder/signal processing circuit 209 and the system controller 212.

The magnetic disk 219 mounted on the magnetic spindle motor 220 is also controlled to rotate at the specified rotation speed by the magnetic spindle motor control circuit 221. The magnetic head module 222 is configured to be moved in the tracking direction by the magnetic head control circuit 223. In addition, a recording/reproducing operation toward the magnetic disk 219 is performed by writing information signals to or reading out information signals from the magnetic disk 219 through the magnetic head module 222 and the magnetic head control circuit 223, while these information signals are transferred back and forth via the encoder/decoder/signal processing circuit 209 and the system controller 212.

The encoder/decoder/signal processing circuit 209 is configured to convert digital data that are information signals to be recorded to or reproduced from the optical disk 201 or the magnetic disk 219 into signals suitable to characteristics of the optical disk 201 or the magnetic disk 209. The compression/decompression processing circuit 214 performs data compression on video/audio signals when data are recorded on the optical disk 201 or the magnetic disk 219 by taking advantage of redundancy of signals and characteristics of senses of sight and hearing of human beings and performs data decompression on compressed data to retrieve the original video/audio signals. In this embodiment, compression/decompression processing is performed on the basis of MPEG (Moving Picture Experts Group) format.

Next, how to record video/audio signals loaded through the image pickup circuit 216 and the microphone 215 to the magnetic disk drive 1 will be described with reference to FIG. 2. When the recording button 218 is pressed, the system controller 212 issues a start-up instruction toward the magnetic drive controller 224. Then the magnetic spindle motor control circuit 221 makes the magnetic spindle motor 220 rotate at the specified rotation speed and the magnetic head control circuit 223 drives the magnetic head module 222 to move in the tracking direction and puts the magnetic head module 222 in operating state. At the same time, after being compressed in the compression/decompression circuit 214, video signals taken by the image pickup circuit 216 and audio signals collected by the microphone 215 are input into the encoder/decoder/signal processing circuit 209 and then the video signals and audio signals are stored on the buffer memory 211 via the system controller 212. When the amount of stored data in the buffer memory 211 gets equal to or greater than the upper limit A of the buffer memory, that is, a first specified value (for example, equal to or greater than 15 MB), the stored data are read out from the buffer memory 211 by the system controller 212 and transferred to the magnetic disk drive 1 via the system controller 212. After receiving a recording start-up instruction issued by the system controller 212, the magnetic drive controller 224 immediately puts the magnetic disk drive 1 in recording state (recording mode) for recording the data transferred via the magnetic head control circuit 223 and the magnetic head module 222, and records the data transferred by the system controller 212 on the magnetic disk 219. Then, when the amount of stored data in the buffer memory 211 gets less than the lower limit B of the buffer memory, that is, a second specified value (for example, less than 1 MB), the system controller 212 stops reading out and transferring stored data from the buffer memory 211. And at the same time the system controller 212 issues a waiting instruction to the magnetic drive controller 224 in the magnetic disk drive 1 and puts the magnetic disk drive 1 in waiting state, that is, low power consumption mode by stopping operations of the magnetic head control circuit 223, the magnetic head module 222, and the magnetic spindle motor 220.

When the amount of stored data in the buffer memory 211 gets equal to or greater than the upper limit A of the buffer memory again because data are continued to be stored in the buffer memory 211 during the recording operation, the magnetic drive controller 224 immediately puts the magnetic disk drive 1 in operating state and then in recording state to record the data transferred by the system controller 212 on the magnetic disk 219 after receiving the start-up instruction and the recording start-up instruction issued again by the system controller 212. Then, when the amount of stored data in the buffer memory 211 gets less than the lower limit B of the buffer memory, the system controller 212 issues a waiting instruction to put the magnetic disk drive 1 in waiting state. The steps are repeated many times until a user presses the recording button. 218 to stop the recording operation. As mentioned above, using the buffer memory 211, the magnetic disk drive 1 is run intermittently by being put in operating or recording state, and in waiting state alternately so that power consumption can be reduced and rise in the internal temperature of the video camera is suppressed.

In this embodiment, in the case where video/audio signals loaded through the image pickup circuit 216 and the microphone 215 are recorded to the optical disk drive 2, the optical disk drive 2 is also run intermittently using the buffer memory 211 in a similar way as the magnetic disk drive 1 so that power consumption can be reduced and rise in the internal temperature of the video camera can be suppressed. In addition, in the case where signals are recorded to the optical disk drive 2, the upper limit A of the buffer memory and the lower limit B of the buffer memory related to the amount of stored data in the buffer memory 211 can be set to be different values from those in the case of the magnetic disk drive 1.

As to the dubbing operation in association with a buffering operation using the buffer memory 211, a flow example of processes and behaviors during the dubbing operation where data are dubbed from the magnetic disk drive 1 to the optical disk drive 2 will be described with reference to FIG. 1 and FIG. 2.

In the case where the power of the video camera is on, if the dubbing button 217 is pressed at Step 101, the flow proceeds to Step 102.

At Step 102, the system controller 212 issues a start-up instruction toward the magnetic drive controller 224, and the magnetic drive controller 224 makes the magnetic spindle motor 220 rotate at the specified rotation speed using the magnetic spindle motor control circuit 221. And at the same time the magnetic drive controller 224 drives the magnetic head module 222 to move in the tracking direction using the magnetic head control circuit 223 and puts the magnetic disk drive 1 in operating state immediately. Then the flow proceeds to Step 103.

At Step 103, after receiving a reproducing start-up instruction issued by the system controller 212, the magnetic drive controller 224 puts the magnetic disk drive 1 in reproducing state (reproducing mode), reads out data stored on the magnetic disk 219 via the magnetic head control circuit 223 and the magnetic memory 210, and stores the data in the buffer memory 211 via the system controller 212 as stored data. Then the flow proceeds to Step 104.

At Step 104, if the amount of stored data in the buffer memory 211 gets equal to or greater than the upper limit A of the buffer memory (for example, equal to or greater than 15 MB), the flow proceeds to Step 106. If the amount of stored data in the buffer memory 211 gets less than the upper limit A of the buffer memory, the flow proceeds to Step 105.

At Step 105, if there are no data to be dubbed in the magnetic disk drive 1, the flow proceeds to Step 106. If there are data to be dubbed in the magnetic disk drive 1, the flow proceeds to Step 103 again.

At Step 106, the system controller 212 issues a waiting instruction to the magnetic drive controller 224 in the magnetic disk drive 1 and puts the magnetic disk drive 1 in waiting state, that is, low power consumption mode by stopping operations of the magnetic head control circuit 223, the magnetic head module 222, and the magnetic spindle motor 220. Then the flow proceeds to Step 107.

At Step 107 the system controller 212 issues a start-up instruction toward the optical drive controller 207 in the optical disk drive 2, and makes the optical spindle motor 202 rotate at the specified rotation speed using the optical spindle motor control circuit 203. And at the same time the system controller 212 drives the optical head module 204 to move in the tracking direction using the optical head control circuit 205 and puts the optical disk drive 2 in operating state immediately. Then the flow proceeds to Step 108.

At Step 108, the current temperature is obtained by the temperature sensor 206, and then the flow proceeds to Step 109.

At Step 109, the optical drive controller 207 judges whether new learning is needed or not while taking into consideration the temperature difference between the current temperature obtained as mentioned above and the temperature that was saved in the optical memory 208 at the time when the learning about the output condition of the laser, etc was finished previously. Here, if new learning processing about the output condition of the laser, etc is needed when the temperature difference is taken into consideration, the flow proceeds to Step 110 and the learning processing is performed. Then the flow proceeds to Step 111. If new learning processing about the output condition of the laser, etc is not needed when the temperature difference is taken into consideration, the flow proceeds to Step 111.

At Step 111, data stored in the buffer memory 211 are read out and transferred to the optical disk drive 1 via the system controller 212. After receiving a recording start-up instruction issued by the system controller 212, the optical drive controller 207 immediately puts the optical disk drive 2 in recording state (recording mode) by increasing the power of the laser of the optical head module 204 to the recording power level, etc. and records the data transferred by the system controller 212 on the optical disk 201 via the optical head control circuit 205 and the optical head module 204. Then the flow proceeds to Step 112.

At Step 112, if the amount of stored data in the buffer memory 211 is less than the lower limit B of the buffer memory (for example, less than 1 MB), the flow proceeds to Step 113. If the amount of stored data in the buffer memory 211 is equal to or greater than the lower limit B of the buffer memory, the flow proceeds to Step 111 and the process to read out the data stored in the buffer memory 211 and send the data to the optical disk 201 is repeated until the amount of stored data in the buffer memory 211 gets less than the lower limit B of the buffer memory. If the judgment that there are no data to be dubbed in the magnetic disk drive 1 has been made previously at Step 105, the stored data in the buffer memory 211 are read out and recorded on the optical disk 201 until the amount of stored data in the buffer memory 211 reaches zero. Then the flow proceeds to Step 113.

At Step 113, the system controller 212 stops reading out and transferring the stored data, and at the same time issues a waiting instruction to the optical drive controller 207 in the optical disk drive 2 and puts the optical disk drive 2 in waiting state, that is, low power consumption mode by stopping operations of the optical head control circuit 205, the optical head module 204, and the optical spindle motor 203. Then the flow proceeds to Step 114.

If the judgment that there are no data to be dubbed in the magnetic disk drive 1 has been made previously at Step 105 and all the data in the magnetic disk drive 1 to be dubbed is read out and dubbed on the optical disk 201 in the optical drive 2 at Step 114, the system controller 212 judges that all the data the user requests to be dubbed have been dubbed, and stops the dubbing operation. If the system controller judges that the data to be dubbed are left in the magnetic disk drive 1, the flow proceeds to Step 102 and the dubbing operation to read out the data in the magnetic disk drive 1 and dub the data on the optical disk 201 is repeated.

This embodiment has four modes as to the movement thereof, that is, operating state (operating mode), reproducing state (reproducing mode), recording state (recording mode), and waiting state (waiting mode). And operating state (operating mode), reproducing state (reproducing mode), and recording state (recording mode) are given a generic name "behaving state". In waiting mode, various modules other than modules that communicate with the system controller 212 (for example, spindle motors, the laser of the optical head module and so on) are not supplied with power. In particular, the stoppage of supplying power to the laser of the optical head module 204 in the optical disk drive 2 is very effective in reducing power consumption and suppressing heat generation (rise in temperature). In addition, even in reproducing state, it can be expected that reducing reading rates or rotation speeds will result in electric power saving or low heat generation. Such states as are leading to electric power saving as well as waiting state, are given a generic name "power saving state (power saving mode)".

This embodiment includes the magnetic disk drive as a master and the optical disk drive as a slave using only one primary line as a control line. Therefore, the control line configuration of this embodiment is simple compared with control line configurations that use a primary line and a secondary line as control lines. And at the same time because it is possible to reduce the area of the circuit board, reduction of the production cost and the miniaturization of the product are realized. However, this embodiment can be also realized using two control lines as a primary line and a secondary line.

Figure 3:
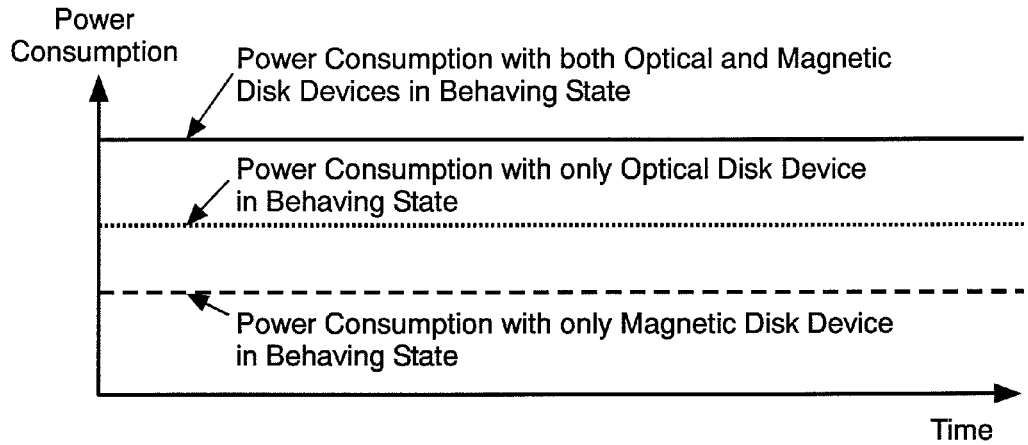
FIG. 3 is an explanatory drawing showing examples of power consumed during the dubbing operation performed in the video camera of the first embodiment.
Figure 4A:
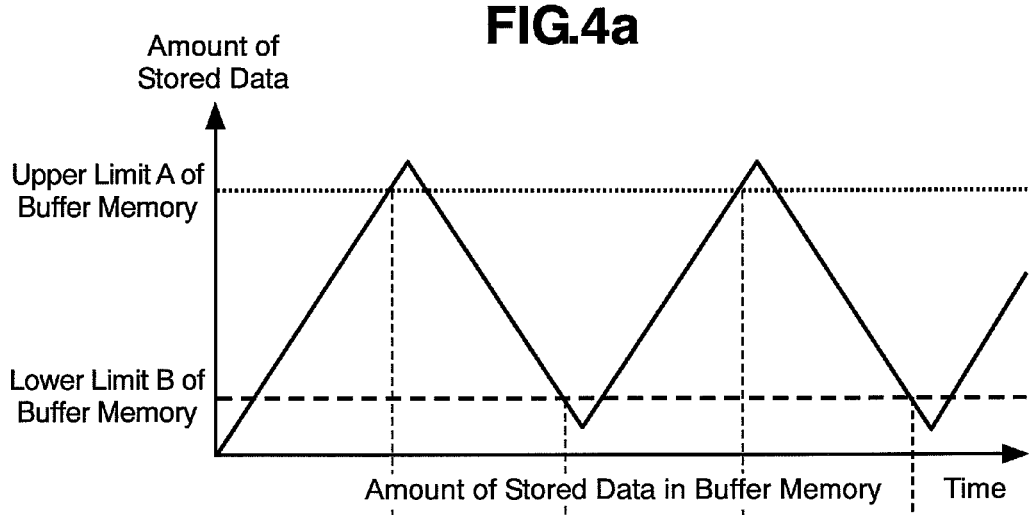
FIG. 4 is an explanatory drawing showing an example of the amount of stored data and an example of power consumed during the dubbing operation performed in the video camera of the first embodiment.
Figure 4B:
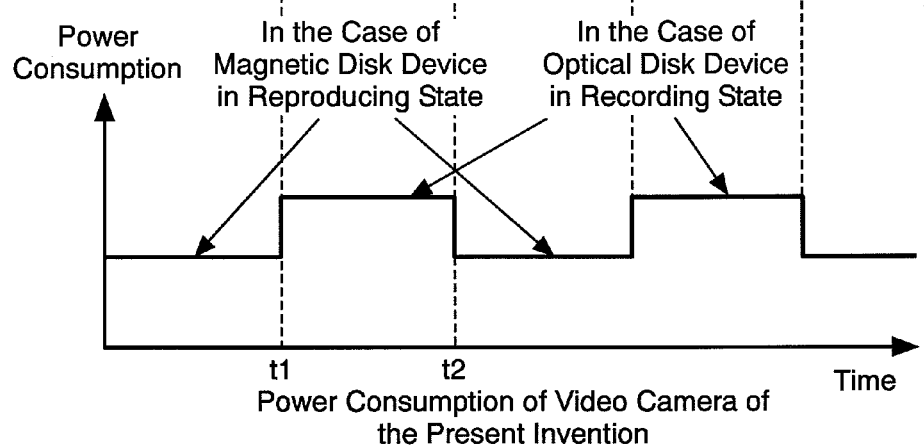
Figure 5:
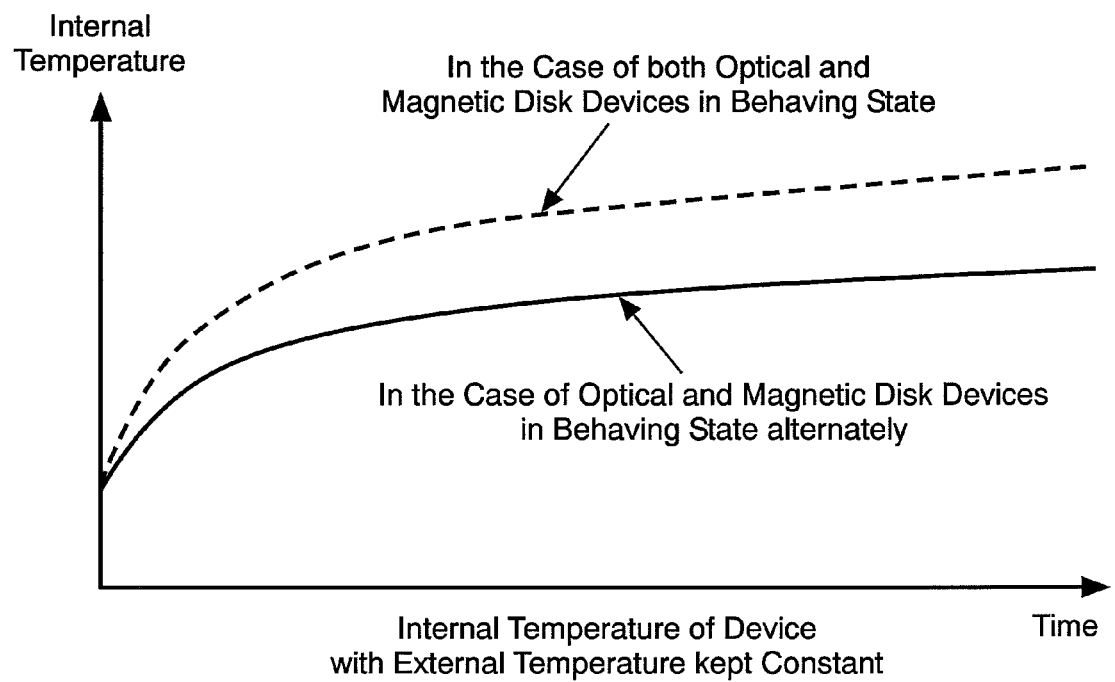
FIG. 5 is an explanatory drawing showing examples of the internal temperatures of the video camera of the first embodiment during the dubbing operation performed in the video camera.

Next, in the case of a dubbing operation where data are transferred from the magnetic disk drive 1 to the optical disk drive 2, examples of behaviors of the buffer memory 211, power consumption and the internal temperature of the video camera will be described with reference to FIG. 3 to FIG. 5. FIG. 3 is an explanatory drawing showing examples of power consumed during the dubbing operation performed in the video camera with both the optical and the magnetic disk drives in behaving state, FIG. 4 is an explanatory drawing showing an example of the amount of stored data and an example of power consumed during the dubbing operation performed in the video camera, and FIG. 5 is an explanatory drawing showing examples of the internal temperatures of the video camera during the dubbing operation performed in the video camera. FIG. 4(a) is an explanatory drawing showing an example of the amount of stored data in the buffer memory during the dubbing operation in the video camera. FIG. 4(b) is an explanatory drawing showing an example of power consumed during the dubbing operation performed in the video camera.

As shown in FIG. 3, during dubbing operation wherein both the magnetic disk drive 1 and the optical disk drive 2 are in behaving state, power consumption of the video camera is equal to the sum of power consumed by the magnetic disk drive 1, power consumed by the optical disk drive 2, and power consumed by the information signal recording/reproducing device 3. This power consumption is 7.6 W, for example.

In this embodiment, when the dubbing operation starts, firstly only the magnetic disk drive 1 gets into operating state and then into reproducing state to store data in the buffer memory 211. Secondly, if the amount of stored data in the buffer memory 211 gets equal to or greater than the upper limit A of the buffer memory (at time t1), the magnetic disk drive 1 gets into waiting state, and at the same time the optical disk drive 2 gets into operating state and then into recording state, and the stored data in the buffer memory 211 are read out and recorded on the optical disk 201. And then, if the amount of stored data in the buffer memory 211 gets less than the lower limit B of the buffer memory (at time t2), the optical disk drive 2 gets into waiting state, and at the same time the magnetic disk drive 1 gets into operating state and then into recording state to store data in the buffer memory 211.

As mentioned above, the magnetic disk drive 1 and the optical disk drive 2 are activated alternately so that power consumption of the video camera is almost the sum of power consumed by the magnetic disk drive 1 and power consumed by the information signal recording/reproducing device 3 as shown in FIG. 4(b) when the magnetic disk drive 1 is reading out data because the optical disk drive 2 is in waiting state, that is, low power consumption mode. On the other hand, when the optical disk drive 2 is recording data, power consumption of the video camera is almost the sum of power consumed by the optical disk drive 2 and power consumed by the information signal recording/reproducing device 3 because the magnetic disk drive 1 is in waiting state, that is, low power consumption mode.

For example, power consumption during the state where the magnetic disk drive 1 is reading out data (reproducing mode) is 3.23 W and power consumption during the state where the optical disk drive 2 is recording data (recording mode) is 5.15 W. Consequently, average power consumption during the dubbing operation is 4.1 W. Because this value is smaller than 7.6 W described in FIG. 3, it is easily understood that power consumption is reduced. This means that it is possible to suppress rise in temperature in a video camera and at the same time this allows a battery-driven video camera to be used for a longer time.

Rise in the internal temperature of the video camera in the case where the optical disk drive 2 and the magnetic disk drive 1 are in behaving state alternately is shown in solid line in FIG. 5. It is easily understood that rise in the internal temperature is greatly suppressed in this case compared with rise in the internal temperature of the video camera in the case of both the optical and the magnetic disk drives in behaving state (shown in dotted line).

Figure 1:
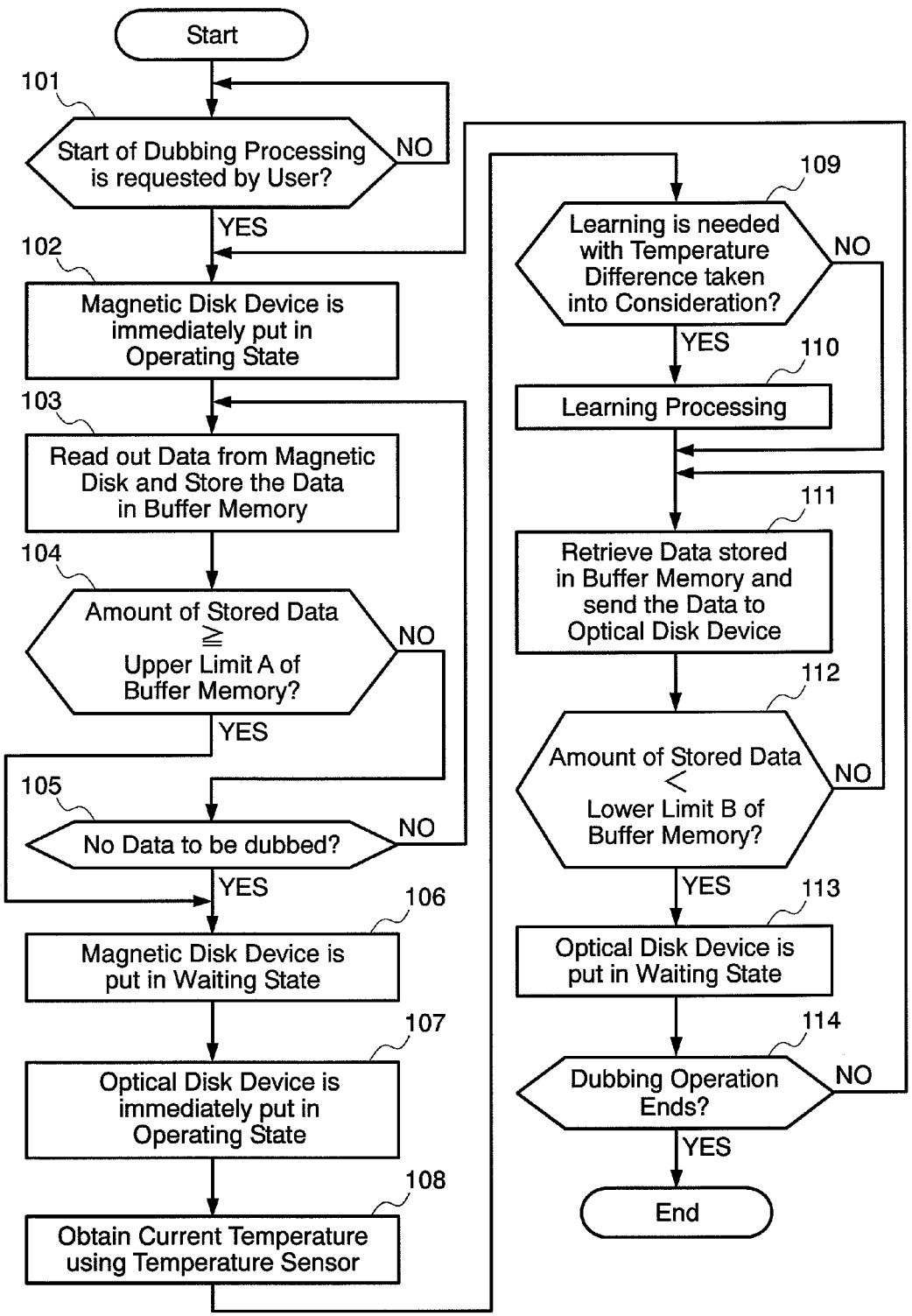
FIG. 1 is a flowchart showing a processing example during a dubbing operation performed in a video camera of a first embodiment of the present invention.
Figure 6:
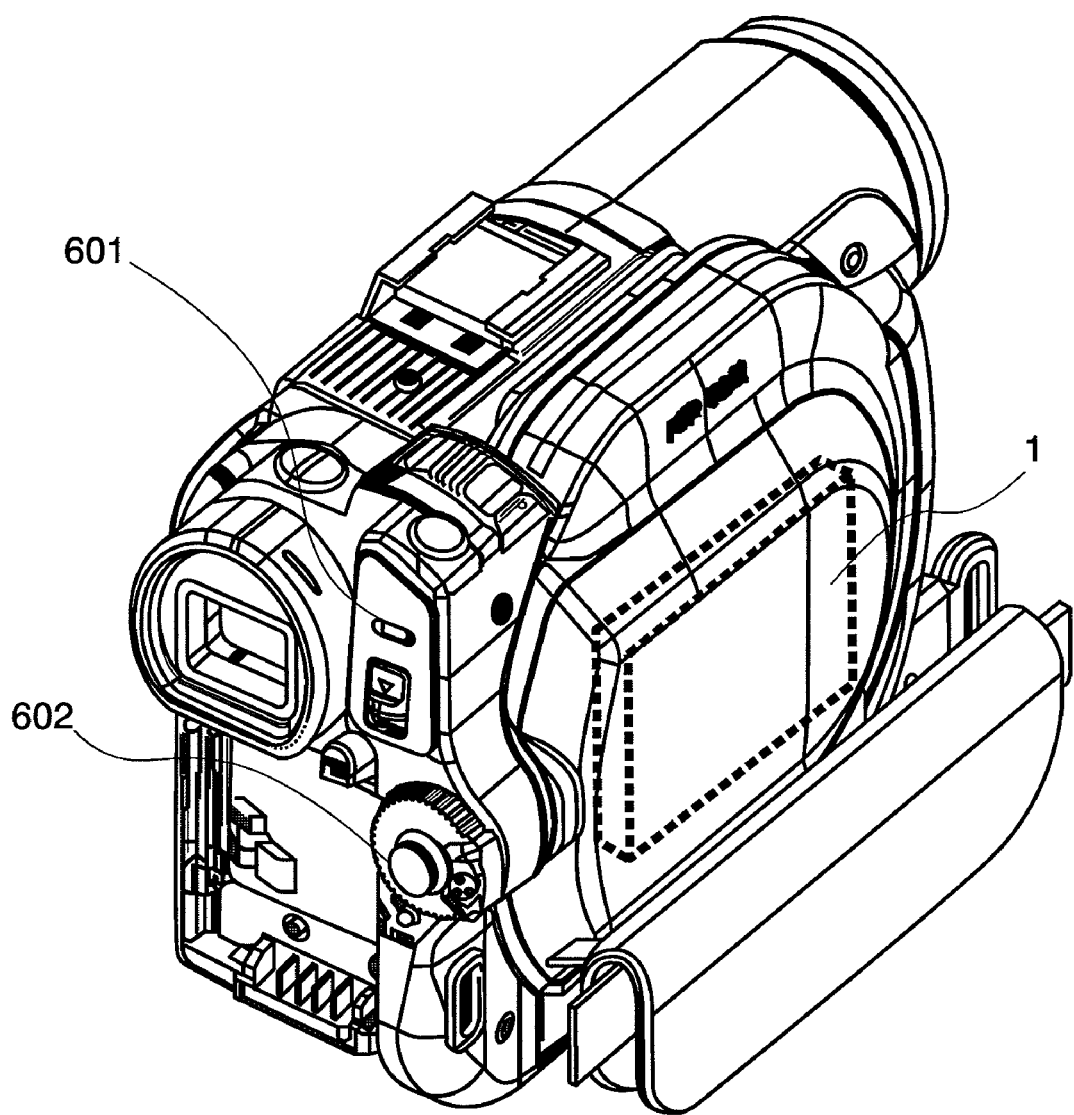
FIG. 6 is a perspective view showing an example of an external appearance of the video camera.

FIG. 6 shows an example of an external appearance of the video camera in which: 601 is a set of access lamps that show behaving states of the magnetic disk drive 1 or the optical disk drive 2, 602 is a recording button to start or stop recording (corresponding to 218 in FIG. 1).

When the magnetic disk drive is in operating state or reproducing state, a blue lamp blinks on and off; when the optical disk drive is in operating state or recording state, a red lamp blinks on and off; and when both the magnetic disk drive and the optical disk drive are in operating state, recording state or reproducing state, a green lamp blinks on and off. And neither the magnetic disk drive 1 nor the optical disk drive 2 is in behaving state, all the lamps are off.

Although the description that behaving states of the magnetic disk drive 1 and the optical disk drive 2 are distinguished by blinking of the access lamps with different colors has been made, the colors of the access lamps are not limited to the colors and the way to light the access lamps is also not limited to the way. For example, when both the magnetic disk drive 1 and the optical disk drive 2 are in behaving state, the red lamp can blink on and off, or the red lamp can be on instead of blinking on and off.

Second Embodiment

A second embodiment of the present invention will be described below with reference to FIG. 7 to FIG. 11.

In the first embodiment, the optical disk drive and the magnetic disk drive are unconditionally activated alternately. In the second embodiment, an example wherein an optical disk drive and a magnetic disk drive are activated alternately depending on some conditions will be described.

Figure 7:
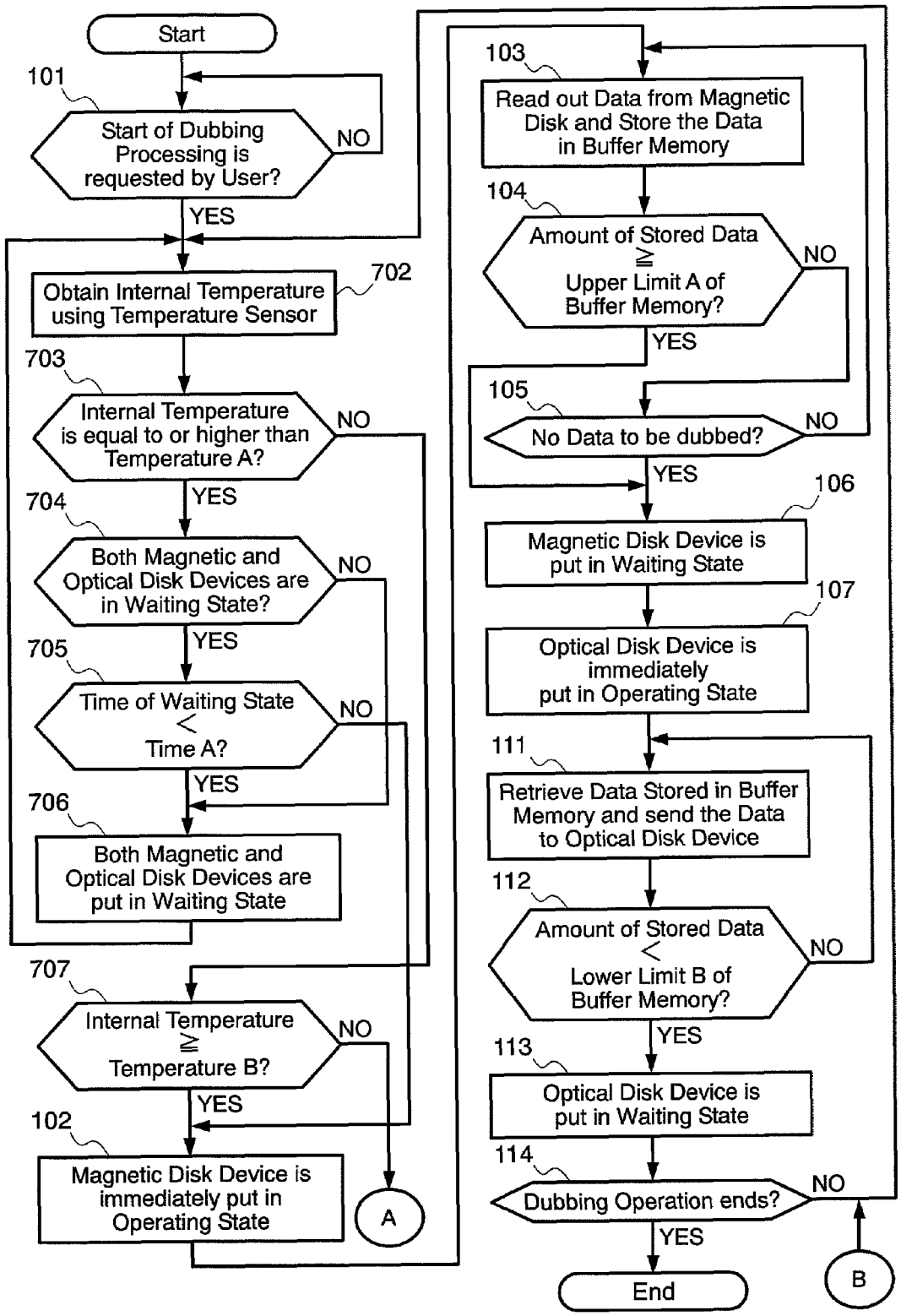
FIG. 7 is a flowchart (1) showing a processing example during a dubbing operation performed in a video camera of a second embodiment of the present invention.
Figure 8:
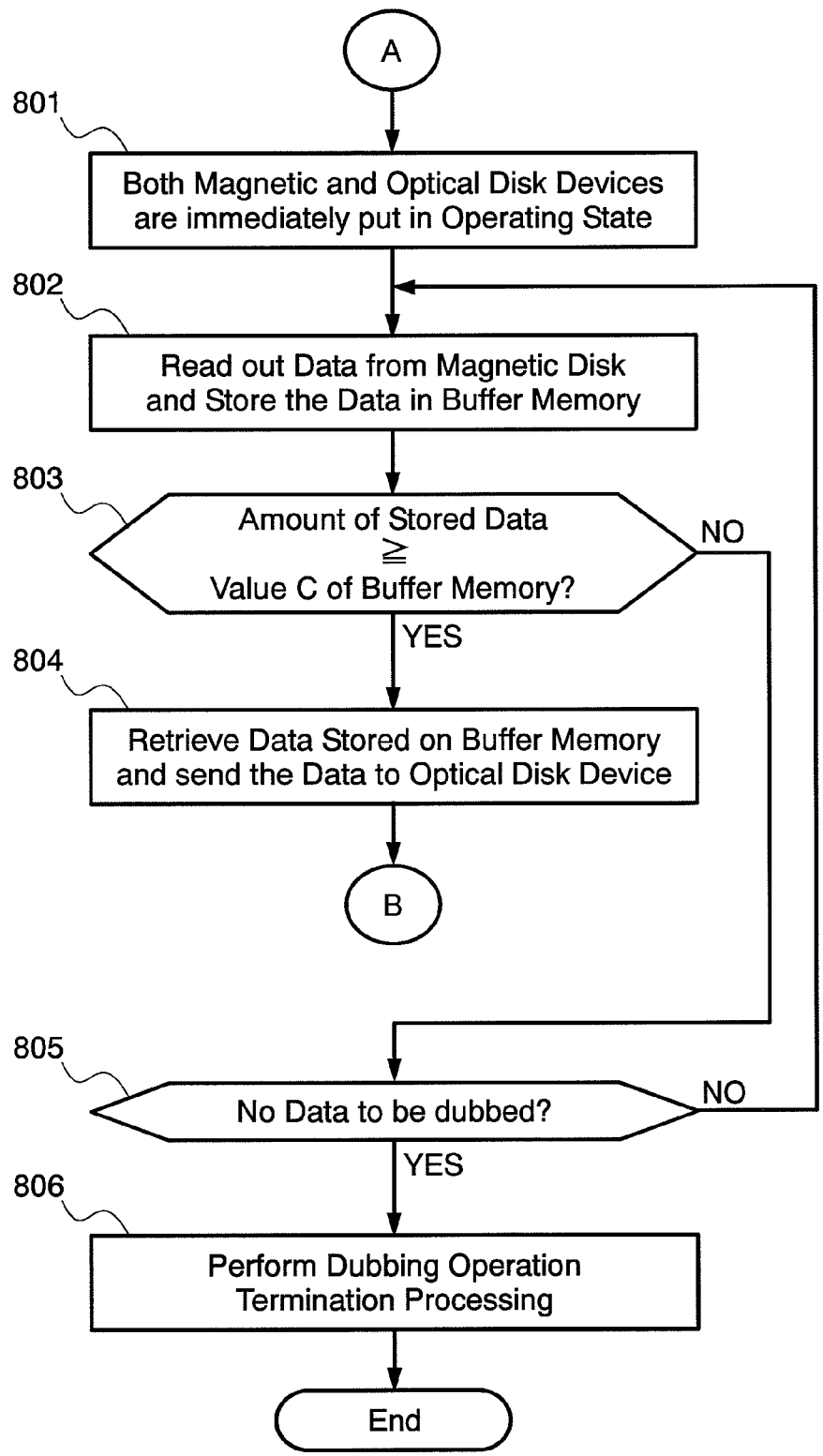
FIG. 8 is a flowchart (2) showing a processing example during a dubbing operation performed in a video camera of a second embodiment.
Figure 9:
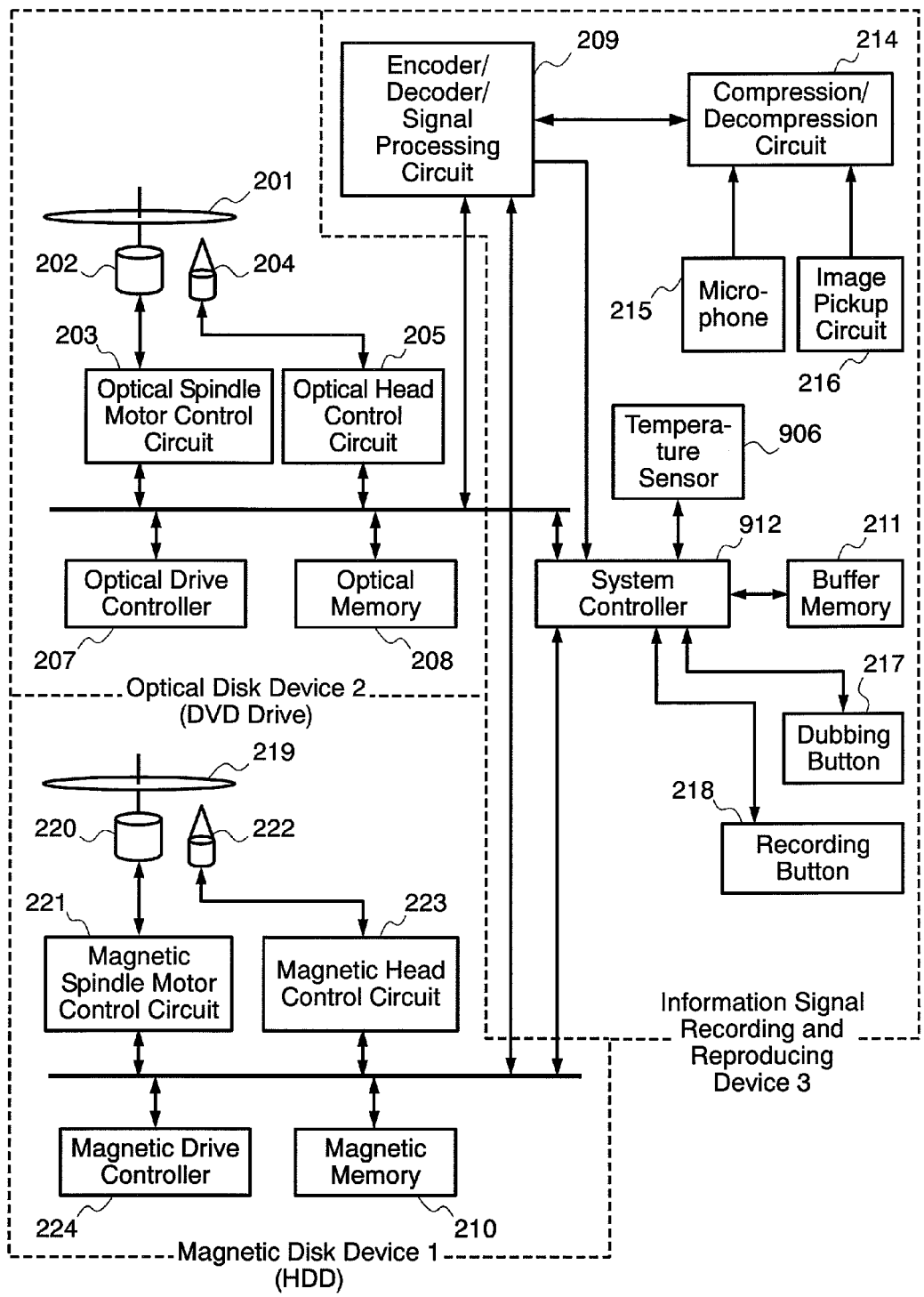
FIG. 9 is a block diagram showing a configuration example of the video camera of the second embodiment.

A flow example of behaviors and control processes during a dubbing operation performed in a video camera of the second embodiment will be described with reference to FIG. 7, FIG. 8, and FIG. 9. FIG. 7 is a flowchart (1) during the dubbing operation performed in the video camera of the second embodiment; FIG. 8 is a flowchart (2) during the dubbing operation performed in the video camera of the second embodiment; and FIG. 9 is a block diagram of the video camera of the second embodiment.

Firstly, differences between the block diagram of FIG. 9 that shows a configuration example of the video camera of the second embodiment and that of FIG. 2 will be described. Blocks in FIG. 9 that are the same as those in FIG. 2 are given the same numbers as in FIG. 2, and descriptions about those blocks in FIG. 9 are omitted. FIG. 9 is equipped with a temperature sensor 906 that forms a temperature detecting module instead of the temperature sensor 206 in FIG. 2. The difference between the temperature sensor of the first embodiment and that of the second embodiment resides in their locations. In the first embodiment, the sensor is located in the optical disk drive 1 and it is mainly used for detecting the internal temperature of the optical disk drive 1, while in the second embodiment, the sensor is located in an information recording/reproducing device 13 and it is mainly used for detecting the internal temperature of the video camera.

Secondly, as to a dubbing operation in association with a buffering operation using a buffer memory 211, a flow of processes and behaviors during the dubbing operation where data are dubbed from a magnetic disk drive 11 to an optical disk drive 12 will be described with reference to FIG. 7, FIG. 8, and FIG. 9. Steps in FIG. 7 that are the same as those in FIG. 1 of the first embodiment are given the same numbers as in FIG. 1, and descriptions about those Steps in FIG. 7 are omitted.

In the case where the power of the video camera is on, if a dubbing button 217 is pressed at Step 101, the flow proceeds to Step 702.

At Step 702, a system controller 212 obtains the current temperature through the temperature sensor 906, and then the flow proceeds to Step 703.

At Step 703, if the current temperature is equal to or higher than the temperature A, that is, a third specified value (for example, equal to or higher than 60° C.), the flow proceeds to Step 704. If the current temperature is less than the temperature A, the flow proceeds to Step 707.

At Step 704, when both the magnetic disk drive 11 and the optical disk drive 12 are in waiting state, the flow proceeds to Step 705. When both the magnetic disk drive 11 and the optical disk drive 12 are not in waiting state, that is, both the magnetic disk drive 11 and the optical disk drive 12 are in behaving state or either one of them is in behaving state, the flow proceeds to Step 706.

At Step 706, both the magnetic disk drive 11 and the optical disk drive 12 are put in waiting state, and the flow proceeds to Step 702. Steps from Step 702 to Step 706 are repeated until the internal temperature gets less than the temperature A. In the case where the internal temperature is equal to or higher than the temperature A, the recording/reproducing ability of the magnetic disk drive 11 or the optical disk drive 12 deteriorates significantly. Therefore, both the magnetic disk drive 11 and the optical disk drive 12 are put in halting state so that there is adequate drop in the internal temperature.

At Step 705, if the time of waiting state of the magnetic disk drive 11 and the optical disk drive 12 is less than the time A, that is, a forth specified value (for example, less than 1 minute), the flow proceeds to Step 706. If the time of waiting state of the magnetic disk drive 11 and the optical disk drive 12 is equal to or longer than the time A (for example, equal to or longer than 1 minute), the flow proceeds to Step 708. In other words, both the magnetic disk drive 11 and the optical disk drive 12 are put in operating state if the time of waiting state of the magnetic disk drive 11 and the optical disk drive 12 is equal to or longer than the time, so that the inconvenience to users caused by the longtime stoppage of the dubbing function is prevented. In addition, in this embodiment the time A is determined with the changing situation of the internal temperature of the video camera in waiting state taken into consideration. And now the time A is set to be 1 minute as an example, but the time A can be a different value.

At Step 707, the judgment whether the temperature obtained as mentioned above is equal to or higher than the temperature B, that is, a fifth specified value (for example, equal to or higher than 45° C.) or not is made. Here, if the temperature is less than the temperature B, the fifth specified value, the flow proceeds to Step 801 in FIG. 8.

At Step 801, the system controller 212 issues a start-up instruction toward an optical drive controller 207 and a magnetic drive controller 224. Then the optical drive controller 207 makes an optical spindle motor 202 rotate at the specified rotation speed using an optical spindle motor control circuit 203, and the magnetic drive controller 224 makes an magnetic spindle motor 220 rotate at the specified rotation speed using an magnetic spindle motor control circuit 221 with the result that both the optical disk drive 12 and the magnetic disk drive 11 are immediately put in operating state and the flow proceeds to Step 802. Here, in the case where the optical disk drive 12 and/or the magnetic disk drive 11 are put in operating state, operating devices shall maintain their operating state, and halting devices shall be put in operating state.

At Step 802, after receiving a reproducing start-up instruction issued by the system controller 212, the magnetic drive controller 224 puts the magnetic disk drive 11 in reproducing state (reproducing mode), reads out data stored on the magnetic disk 219 by driving the magnetic head control circuit 223 and the magnetic memory 210, and stores the data in the buffer memory 211 via the system controller 212 as stored data. Then the flow proceeds to Step 803.

At Step 803, the judgment whether the amount of stored data in the buffer memory 211 is equal to or greater than the value C of the buffer memory, that is, a third specified value (for example, equal to or greater than 5 MB) or not is made. If the amount of stored data in the buffer memory 211 is equal to or greater than the value C of the buffer memory, the flow proceeds to Step 804. If the amount of stored data in the buffer memory 211 is less than the value C of the buffer memory, the flow proceeds to 805.

At Step 805, if there are no data to be dubbed in the magnetic disk drive 1, the flow proceeds to Step 806. If there are data to be dubbed in the magnetic disk drive 1, the flow proceeds to Step 802 again.

At Step 804, data stored in the buffer memory 211 are read out and transferred to the optical disk drive 12 via the system controller 212. After receiving a recording start-up instruction issued by the system controller 212, the optical drive controller 207 immediately puts the optical disk drive 12 in recording state (recording mode) by driving an optical head control circuit 205 and an optical head 204, and records the data transferred by the system controller 212 on an optical disk 201. Then the flow proceeds to Step 702 in FIG. 7 and the dubbing operation is repeated again.

In this embodiment, the reading data rate of the magnetic disk drive 11 in reproducing state and the data recording rate of the optical disk drive 12 are matched to the slower rate of the two. Therefore the amount of the stored data in the buffer memory is not reduced. If the current temperature obtained using a temperature sensor 906 at Step 702 is less than the temperature B again, the flow proceeds to Step 803 via Step 703, Step 707, Step 801 and Step 802. And at Step 803, the amount of the stored data in the buffer memory is equal to or greater than the value C of the buffer memory because the amount of the stored data in the buffer memory has not been changed, with the result that the writing process and the reading out process from Step 802 to Step 804 are performed at the same time. Therefore, it is possible to perform high speed dubbing processing because the magnetic disk drive 11 is always in reproducing state and the optical disk drive 12 is always in recording state.

At Step 806, if the stored data in the buffer memory 211 have been read out until the amount of stored data in the buffer memory 211 reaches zero, and all the data in the magnetic disk drive 11 to be dubbed have been dubbed on the optical disk 201 of the optical disk drive 12, the system controller 212 judges that all the data a user requests to be dubbed have been dubbed, and stops the dubbing operation.

At Step 707, if the temperature obtained through a temperature sensor 906 is equal to or higher than the temperature B, the flow proceeds to Step 102.

As mentioned above, it is possible to suppress rise in the internal temperature of the apparatus by putting the halting drive of the two drives in low power consumption mode. In particular, in waiting state of the optical disk drive 2 that performs a recording operation, the stoppage of supplying power to the laser of the optical head module 204 in the optical disk drive 2 is very effective in reducing power consumption.

Figure 10:
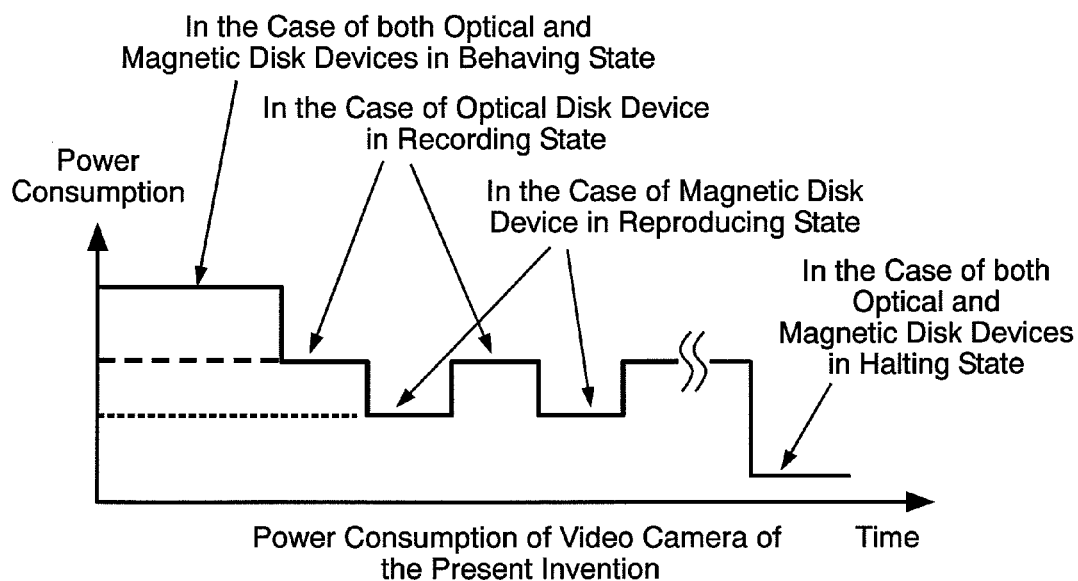
FIG. 10 is an explanatory drawing showing an example of power consumed during the dubbing operation performed in the video camera of the second embodiment.
Figure 11:
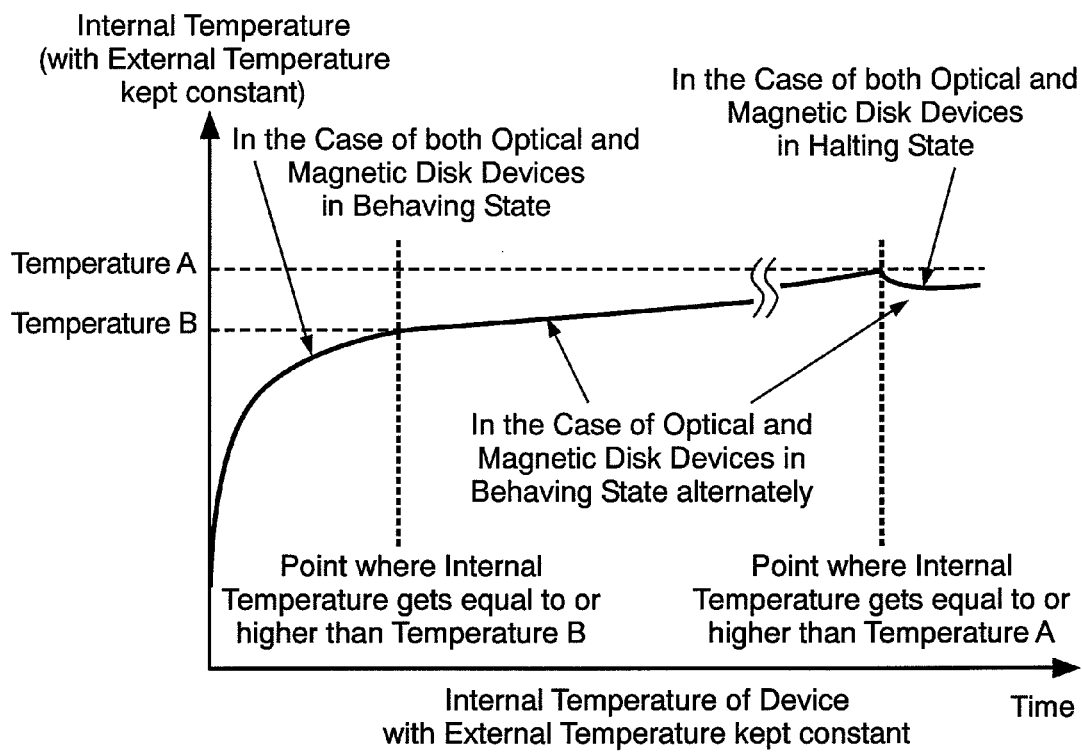
FIG. 11 is an explanatory drawing showing an example of the internal temperature of the video camera of the second embodiment during the dubbing operation performed in the video camera.

Next, power consumption and the internal temperature of the video camera during the dubbing operation to dub data from the magnetic disk drive 11 to the optical disk drive 12 will be described with reference to FIG. 10 and FIG. 11. FIG. 10 is an explanatory drawing showing an example of power consumed during the dubbing operation performed in the video camera of the second embodiment. FIG. 11 is an explanatory drawing showing an example of the internal temperature of the video camera of the second embodiment during the dubbing operation performed in the video camera.

In FIG. 11, when the internal temperature of the video camera is less than the temperature B (for example, 45° C.), power consumption of the video camera is equal to the sum of power consumed by the magnetic disk drive 11, power consumed by the optical disk drive 12, and power consumed by the information signal recording/reproducing device 13, as shown in FIG. 10, because both the magnetic disk drive 11 and the optical disk drive 12 are put in behaving state during the dubbing operation. This power consumption is 7.6 W, for example. Then the internal temperature rises because both the magnetic disk drive 11 and the optical disk drive 12 are in behaving state. When the internal temperature is equal to or higher than the temperature B and less than the temperature A (for example, less than 60° C.), the magnetic disk drive 11 and the optical disk drive 12 are put in behaving state alternately with the halting drive of the two drives put in low power consumption mode during the dubbing operation. Therefore, power consumption of the video camera is almost equal to the sum of power consumed by either the magnetic disk drive 11 or the optical disk drive 12, and power consumed by the information signal recording/reproducing device 13, as shown in FIG. 10 (for example, 4.1 W). When the internal temperature reaches to the point equal to or higher than the temperature A (for example, equal to or higher than 60° C.), as shown in FIG. 11, due to the alternate behaviors of the two drives or rise in the external temperature, power consumption of the video camera is almost equal to power consumed by the information signal recording/reproducing device 13 (for example, 2.5 W) because both the magnetic disk drive 11 and the optical disk drive 12 are put in waiting state, with the result that the internal temperature begins to decrease.

As mentioned above, when the internal temperature is low, both the magnetic disk drive 11 and the optical disk drive 12 can be put in behaving state, resulting in high speed dubbing processing. And when the internal temperature is equal to or higher than the temperature B, dubbing processing with electric power saving is performed by putting the magnetic disk drive 11 and the optical disk drive 12 in behaving state alternately, with the result that rise in the internal temperature is suppressed. Furthermore, when the internal temperature reaches to the point equal to or higher than the temperature A, the capability deterioration of dubbing processing at a high temperature can be prevented by putting both the magnetic disk drive 11 and the optical disk drive 12 in waiting state.

An example of a display screen that is displayed when the internal temperature is equal to or higher than the temperature A will be described with reference to FIG. 12. FIG. 12 is an example of a display screen of the video camera in the second embodiment.

When the internal temperature is equal to or higher than the temperature A as shown in FIG. 11, and both the magnetic disk drive 11 and the optical disk drive 12 are put in waiting state, a display screen showing "Dubbing is inoperative due to Rise in Temperature" is displayed. It is possible to let users know that dubbing processing is in halting state by displaying this display screen. In addition, the alarm that informs users that the internal temperature exceeds a temperature threshold where one behaving mode changes to another behaving mode can be also issued.

The first embodiment of the present invention and the second embodiment of the present invention have been described as above. The first embodiment and the second embodiment are not independent of each other. Some of the functions or components of the first embodiment can be picked up on the second embodiment and vice versa. For example, the temperature sensor 206 of the first embodiment in FIG. 2 can be picked up on the second embodiment in FIG. 9. In addition, Step 108 to Step 110 in FIG. 1 can be implemented in FIG. 7 (for example, between Step 107 and Step 111) or in FIG. 8 (for example, between Step 801 and Step 802).

In the first embodiment and second embodiment, although a dubbing operation where data are transferred from a magnetic disk drive to an optical disk drive has been described as an example, the dubbing operation can be changed so that data are transferred from an optical disk drive to a magnetic disk drive.

The threshold A, B or C of the amount of stored data in the buffer memory can be adaptively changed according to the degree of rise in temperature and so on. For example, when there is rise in temperature that is equal to or higher than a certain degree, the threshold A, B or C of the amount of stored data in the buffer memory can be lowered.

In the first embodiment and second embodiment, although one device is put in waiting state when the other device is in behaving state, the former can be put in the state where power is not supplied. The halting device can be adaptively put in waiting state or in the state where power is not supplied according to the degree of rise in temperature. The transfer time during a dubbing operation and the degree of suppression of rise in temperature vary depending on the types of halting states. For example, when the halting device is put in the state where power is not supplied, the degree of suppression of rise in temperature is greater than in waiting state but the transfer speed during the dubbing operation lowers.

Although the descriptions have been made about the behaviors of the apparatus during a dubbing operation, these descriptions can be applied to the behaviors of the apparatus during a data transfer operation. Here, dubbing is copying video data, audio data and so on from the original media to other media, while data transfer includes moving video data, audio data and so on from the original media to other media without leaving the original data on the original media as well as dubbing.

Although the descriptions have been made about the behaviors of the apparatus with the magnetic disk drives 1 and the optical disk drive 2, these descriptions can be applied to the behaviors of the apparatus wherein dubbing processing is performed from some multiple recording/reproducing modules to other multiple recording/reproducing modules. In addition, recording/reproducing modules are not limited to magnetic disk drives and optical disk drives. For example, one of two or the other recording/reproducing module can be a memory card or a built-in semiconductor memory. Further, it is not necessary that both two modules are dual-purpose modules, that is, recording/reproducing modules, but one module can be a single purpose recording module and the other can be a single purpose reproducing module.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A portable information recording/reproducing apparatus comprising:
    an image pickup module to take an image of video information of a subject;
    a first and a second recording/reproducing module;
    a buffer memory for storing information temporarily;
    a temperature detection module; and
    a control module controlling the first and second recording/reproducing module, wherein:
    the control module controls such that the amount of information stored in the buffer memory is changed depending on the temperature detected by the temperature detection module, and
    the control means, in the case where information is dubbed from the first recording/reproducing module to the second recording/reproducing module by battery drive;
    alternately switches between a first mode and a second mode if the temperature detected by the temperature detection module is less than a first temperature, in the first mode, information in the first recording/reproducing module being reproduced and the information signal being stored in the buffer memory and, in the second mode, the information in the buffer memory being recorded in the second recording/reproducing module;
    alternately switches between the first mode and the second mode if the temperature detected by the temperature detection module is equal to or higher than the first temperature and less than a second temperature higher than the first temperature, in the first mode, operation of the head portion of the second recording/reproducing module being put into a lower power consumption state than in the recording state or in the reproducing states and, in the second mode, the first recording/reproducing module being put into a lower power consumption state than in the recording state or in the reproducing state; and
    alternately switches between the first mode and the second mode if the temperature detected by the temperature detection module is equal to or higher than the second temperature, in the first mode, the operation of both the head portion of the second recording/reproducing module and the recording medium driving portion of the second recording/reproducing module being stopped and the second recording/reproducing module being put into a lower power consumption state than in the recording state or in the reproducing state and, in the second mode, the first recording/reproducing mode being put into a lower power consumption state than in the recording state or in the reproducing state.

* * * * *